United States Patent Office.

OTTO ERNST AND KARL SCHIRMACHER, OF HÖCHST-ON-THE-MAIN, GERMANY, ASSIGNORS TO THE FARBWERKE, VORMALS MEISTER, LUCIUS & BRÜNING, OF SAME PLACE.

VIOLET-BLACK AZO DYE AND PROCESS OF MAKING SAME.

SPECIFICATION forming part of Letters Patent No. 667,935, dated February 12, 1901.

Application filed May 23, 1900. Serial No. 17,627. (Specimens.)

*To all whom it may concern:*

Be it known that we, OTTO ERNST, Ph. D., and KARL SCHIRMACHER, Ph. D., subjects of the Emperor of Germany, residing at Höchst-on-the-Main, Germany, have invented certain new and useful Improvements in the Manufacture of Violet-Black Azo Dyestuffs for Wool, of which the following is a specification.

The black azo dyestuffs for wool hitherto and now on the market are all disazo dyestuffs, which, though inferior in their property of dyeing evenly, are generally employed in wool-dyeing on account of their comparative cheapness and some advantages in their properties of fastness.

Several methods have become known of late by which black dyes may be obtained on wool with evenly-dyeing monoazo dyestuffs—as, for instance, that described in the German Patent No. 90,770. The monoazo dyestuffs produced for this purpose, however, could not compete with the disazo blacks for wool obtained partly from the cheapest material in the coal-tar industry. We have found that from diazotized 6-nitro-2-amido-1-phenol-4-sulfonic acid, on the one hand, and beta-naphthol, on the other hand, a monoazo body may be obtained which directly dyes wool deep violet and which on treatment with chromium compounds may be transformed into a black dye of excellent properties. The tinctorial power is considerable. The fastness to water, acid, alkali, light, rubbing, and sulfur is excellent. The fastness to milling and shrinking is perfect, and the properties of dyeing evenly are very remarkable, for even inferior material of loose wool is dyed evenly. The valuable properties of the beta-naphthol dyestuff, especially its deep-violet shade, could not be foreseen. In fact, the sulfonic acids of beta-naphthol, combined with diazotized 6-nitro-2-amido-phenol-4-sulfonic acid, yield inferior products, though when combined with diazo compounds in general they produce bluer shades than beta-naphthol itself does. Even the substitution of an isomeric nitroamidophenolsulfonic acid for 6-nitro-2-amidophenol-4-sulfonic acid leads to little practical result.

The manufacture of the new dyestuff is as follows: 3.84 kilos of sodium nitroamidophenolsulfonate are dissolved in one hundred liters of water, to which are added 3.30 liters of hydrochloric acid of 30° Baumé, and the solution is diazotized at 10° to 15° centigrade. The yellow-colored diazo solution is run into a cold solution of 0.70 kilo of caustic soda, 3.30 kilos of soda-ash, and 2.20 kilos of beta-naphthol in thirty liters of water. The formation of the dyestuff takes place at once and the liquid becomes blue violet. The dyestuff separates for the most part as a greenish-colored precipitate. The liquid is heated to about 45° centigrade and stirred at this temperature for some hours. On addition of some salt the small portion of the dyestuff which is in solution is also separated.

When in a dry state, the dyestuff is a brown powder of bronze luster, soluble in water with a violet color, little changed by ammonia. Alcohol dissolves only small quantities of the dyestuff yielding a blue-violet solution.

The solution of the dyestuff in concentrated sulfuric acid is bluish red. When water is added, the dyestuff separates as a brick-red precipitate.

Having now described our invention, what we claim is—

1. The herein-described process for the manufacture of a violet-black dyestuff for wool, which consists in combining the diazo compound of 6-nitro-2-amido-phenol-4-sulfonic acid with beta-naphthol to a monoazo dyestuff, substantially as set forth.

2. The herein-described new black azo dyestuff, which, when in a dry state, is a brown powder of bronze luster, soluble in water with a violet color, little changed by ammonia, alcohol dissolves only small quantities of the dyestuff yielding a blue-violet solution; in concentrated sulfuric acid the solution of the dyestuff is bluish red, when water is added the dyestuff separates as a brick-red precipitate, substantially as set forth.

In testimony that we claim the foregoing as our invention we have signed our names in presence of two subscribing witnesses.

OTTO ERNST.
KARL SCHIRMACHER.

Witnesses:
HEINRICH HAHN,
ALFRED BRISBOIS.